June 12, 1928. 1,673,338
T. E. MITCHELL
PIPE COUPLING
Filed Jan. 23, 1926   2 Sheets-Sheet 1
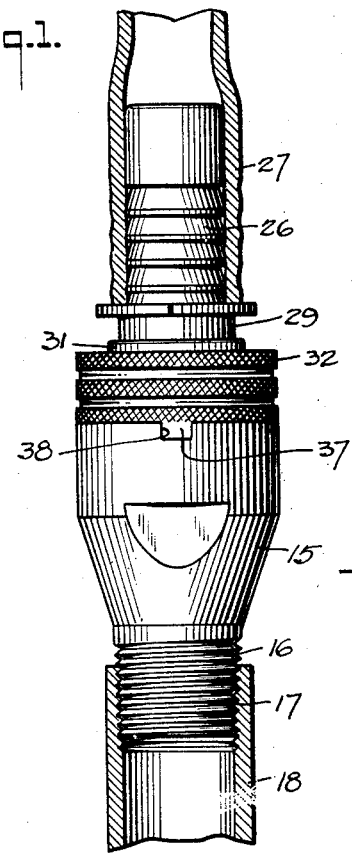
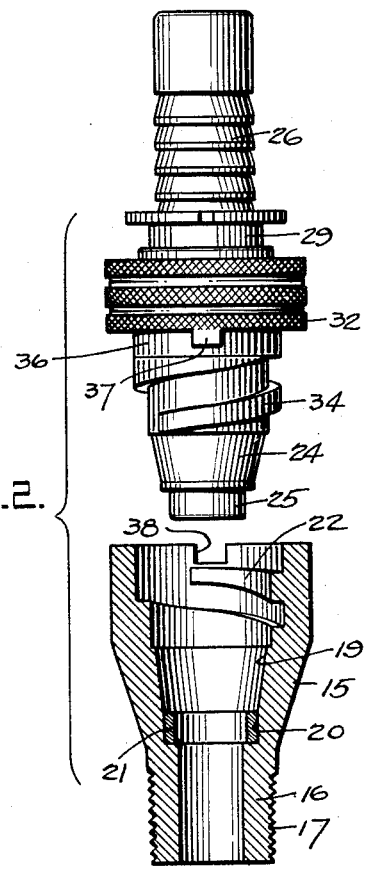
INVENTOR.
THOMAS E. MITCHELL
BY
ATTORNEYS.

June 12, 1928.　　　　　　　　　　　　　　　　1,673,338
T. E. MITCHELL
PIPE COUPLING
Filed Jan. 23, 1926　　　　2 Sheets-Sheet 2

INVENTOR.
THOMAS E. MITCHELL
BY
ATTORNEYS.

Patented June 12, 1928.

1,673,338

UNITED STATES PATENT OFFICE.

THOMAS E. MITCHELL, OF LOS ANGELES, CALIFORNIA.

PIPE COUPLING.

Application filed January 23, 1926. Serial No. 83,349.

My invention relates to detachable pipe couplings, and particularly, although not necessarily, to couplings for connecting a section of rigid pipe with a section of flexible pipe, or two sections of flexible pipe to each other.

It is a purpose of my invention to provide a pipe coupling of the character above specified which functions to prevent twisting of a flexible pipe section and the attendant disadvantages by forming a swivel or rotative connection between the sections, yet maintaining a fluid-tight joint and allowing rapid connecting and disconnecting of the coupling.

It is also a purpose of my invention to provide a coupling of the above described character which consists of a relatively few parts capable of being inexpensively manufactured and readily assembled to produce an inexpensive and extremely durable coupling.

I will describe only one form of pipe coupling embodying my invention and will then point out the novel features thereof in claims.

In the drawings:

Figure 1 is a view showing in side elevation one form of pipe coupling embodying my invention in applied position with respect to a pair of pipe sections;

Figure 2 is a view showing the female member of the coupling illustrated in Figure 1 in section, and the male member in elevation and removed from the female member;

Figure 4:
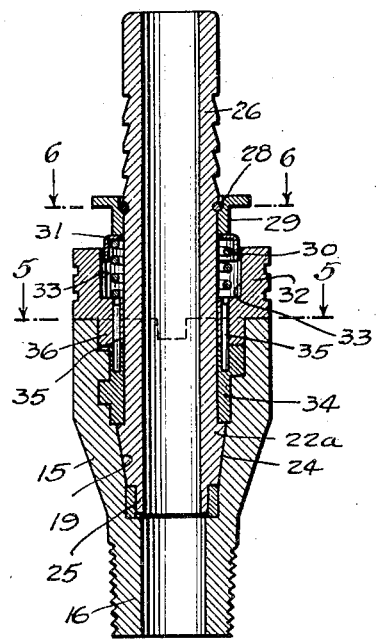
Figure 4 is a view similar to Figure 3, showing the coupling in complete vertical section.
Figure 5:
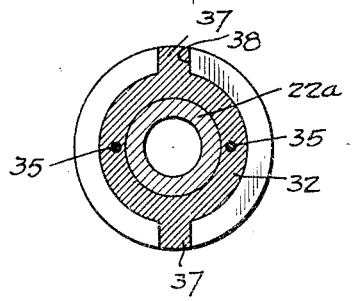
Figure 6:
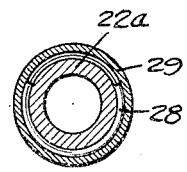

Figures 5 and 6 are transverse sectional views taken on the lines 5—5 and 6—6, respectively, of Figure 4.

Similar reference characters refer to similar parts in each of the several views.

Referring specifically to the drawings, my invention in its present embodiment comprises a female member including a substantially cone shaped body 15 tapered into a tubular extension or nipple 16 exteriorly threaded, as indicated at 17, for connection with a rigid or flexible section of pipe 18, as shown in Figure 1. The body 15 is hollow and a portion of its bore is of conical form, as indicated at 19. At the lower end of this bore is a shouldered pocket 20 in which is received a compressible gasket 21, the internal diameter of which is greater than the diameter of the nipple 16. Above the tapered bore 19 the body 15 is provided with relatively large threads 22 arranged spirally and of rectangular form in cross section, so as to provide the necessary strength to prevent tearing of the threads.

A tubular male member, indicated at 23, is adapted to be extended into the bore of the female member to occupy the position clearly illustrated in Figure 4, and this male member is formed with a conical head 24 which is rotatably fitted in a conical bore 19, the lower end of the head being formed with a reduced extension 25 which seats within the gasket 21 so that the gasket functions to provide a fluid-tight connection between the head and the body 15 of the female member. The upper or outer end portion of the male member is corrugated upon its exterior surface, as indicated at 26, for the purpose of holding a flexible section of pipe 27. Adjacent this corrugated portion the male member is formed with an annular groove in which is seated a spring locking ring 28 for retaining a confining collar 29 against upward movement on the male member. This collar 29 is flanged as shown, to provide an abutment against which the end of the flexible pipe 27 rests. The collar 29 is primarily designed for limiting the upward movement or expansive action of a coiled expansion spring 30 surrounding the male member and with its upper end portion received within a cup 31 which engages the collar 29, as clearly shown in Figure 4. The spring 30 is designed to yieldably urge an annular locking member 32 downwardly or toward the female member 15, and the locking member is constructed to provide a pocket 33 in which the spring 30 is received.

Figure 3:
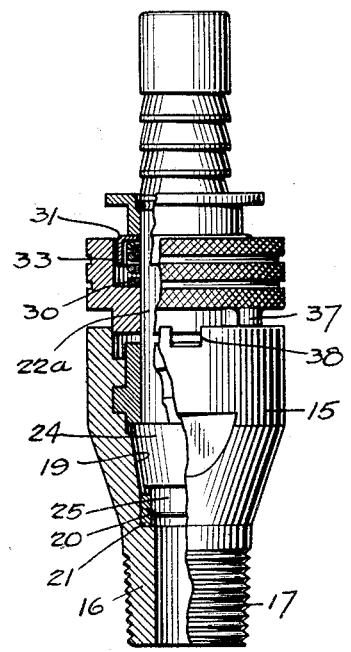
Figure 3 is a view showing the coupling in elevation and partly in section, with the male and female members thereof connected.

The locking member 32 is freely rotatable on the male member 23, and its exterior surface is knurled as clearly shown in Figure 3, to facilitate turning thereof for actuating an exteriorly threaded sleeve 34 to engage or disengage the threads 22 on the female member. As shown in Figure 2, the threads of the sleeve 34 are identical in form to the threads 22, and this sleeve is freely rotatable on the male member, and as previously described, is rotatable by the locking member through the medium of pins 35 secured to the sleeve but freely slidable in suitable openings formed in the locking member in order that the locking member may have independent sliding movement longitudinally on the male member for a purpose which will be hereinafter described. A depending annular lip 36 is formed on the lower or inner side of the locking member 32, through which the pins 35 extend, and this lip is provided for the purpose of properly centering the locking member with respect to the female member to provide a support for a pair of lugs 37 (Figure 5) arranged at diametrically opposed points and adapted to engage within recesses 38 correspondingly arranged in the upper edge of the body 15.

In the operation of the coupling, the male member is adapted to be inserted into the female member as illustrated in Figure 3, and following such insertion the male member may be completely inserted to the position shown in Figure 4 by rotation of the locking member 32 whereby corresponding movement is imparted to the threaded sleeve 34 to screw the latter home within the female member. As the sleeve feeds inwardly the shoulder or confronting face of the locking member engages the upper edge of the body 15, which prevents further downward movement of the locking member. However, through the medium of the pin 35 the operative connection between the locking member and the sleeve is maintained so that continued rotation of the locking member firmly screws the sleeve home within the female member. It will be understood that during this operation the pin 35 slides downwardly within the openings of the female member.

With the sleeve completely threaded in the female member, the locking member occupies a position in which the lugs 37 move into the recesses 38, it being understood that the spring 30 in constantly urging the locking member downwardly, causes the lugs to drop into the recesses as soon as they move into registration therewith. With the lugs in the recesses, it will be manifest that the locking member is locked against rotation and as it is still in operative connection with the threaded sleeve, the loosening or unthreading of the sleeve is positively prevented. In this manner the coupling is locked against the parts thereof uncoupling while the male member 23 can be freely rotated within the female member so as to allow the flexible pipe section carried by the male member to freely rotate and thereby prevent twisting and the attendant disadvantages. Rotation of the male member in either direction is ineffective to unscrew the sleeve; hence the male and female members are securely retained in coupled position.

When desiring to uncouple the male member from the female member it is only necessary to elevate the locking member sufficiently to remove the lugs from the pockets, when such locking member can be rotated to unscrew the sleeve of the female member. Because of the size and pitch of the threads of the sleeve and female member it requires only a little more than a half turn to effect the complete threading or unthreading of the sleeve, and when threading the sleeve in the female member the lugs 37 fall into the recesses 38 upon the completion of the aforesaid rotative movement.

Although I have herein shown and described only one form of pipe coupling embodying my invention, it is to be understood that various changes and modifications may be made in the construction thereof without departing from the spirit of the invention and the spirit and scope of the appended claims.

I claim:

1. A pipe coupling comprising a female member, having a threaded bore, a male member rotatable in the female member, a threaded sleeve rotatable on the male member and engageable with the threaded bore, a locking member rotatable on the male member, an operative connection between the locking member and the sleeve to permit rotation of the sleeve by the locking member and to allow inward feeding of the sleeve independently of the locking member, coacting means on the locking member and female member for locking the locking member against rotation following screwing home of the sleeve into the female member, and means for urging the locking member toward the sleeve whereby the said coacting means is releasably retained in locking position.

2. A pipe coupling comprising a female member having a bore, a portion of which is conical, and the remainder of which is screw threaded, a male member extended into the bore of the female member and having a conical head seated in the conical portion of the bore, a sleeve rotatable on the male member and exteriorly threaded to engage the threaded portion of said bore, a locking member rotatable on the male member, pins carried by the sleeve and slidable in the locking member to provide an operative connection between the two but to permit independent movement of the sleeve longitudinally on the male member, a confining collar secured on the male member, a spring interposed between the locking member and the collar for urging the former in the direction of the sleeve, lugs on the locking member, and recesses in the female member for receiving the lugs to secure the locking member against rotation.

3. A pipe coupling comprising a female member having a threaded bore, a male member, a threaded sleeve rotatable on the male member and engageable with the threaded bore, a locking member rotatable on the male member, means by which the sleeve is operatively connected to the locking member for rotation thereby yet is slidable with respect to the member, means for locking the locking member against rotation, and means acting to releasably retain the locking member in a position wherein said locking means will act to lock the locking member to the female member when the sleeve is screwed into said threaded bore.

THOMAS E. MITCHELL.